United States Patent

[11] 3,628,630

[72] Inventor William C. Hammer
 Cincinnati, Ohio
[21] Appl. No. 38,738
[22] Filed May 19, 1970
[45] Patented Dec. 21, 1971
[73] Assignee Sharvania Oil & Grease Corporation
 Memphis, Tenn.

[54] LUBRICANT DISPERSER
 7 Claims, 4 Drawing Figs.

[52] U.S. Cl. .................................................. 184/50
[51] Int. Cl. ............................................... F16n 11/10
[50] Field of Search ........................................ 137/212;
 184/49, 50, 51; 165/74

[56] References Cited
 UNITED STATES PATENTS
 2,657,764 11/1953 Sharp .......................... 184/50
 3,520,323 7/1970 Lamb ........................... 137/212
 2,074,943 3/1937 Sharp .......................... 184/50
 2,776,729 1/1957 Piros ........................... 184/50
 3,198,405 8/1965 Pfeil ............................ 137/212 X Primary Examiner—Manuel A. Antonakas
Attorney—Berman, Davidson and Berman ABSTRACT: A lubricator for supplying lubricant to the steam main leading to steam operated equipment such as a drop forge hammer, a steam engine, pumps, steam driven air compressors, valves, and any other steam driven equipment best lubricated by having a lubricant atomized or fogged into the steams supply. The lubricator includes a mixing cup into which lubricant is fed and into which condensed steam is introduced. Vacuum from the main is then used to create ebullition causing the lubricant water mixture to overflow the cup and to be drawn into the steam main to mix with the steam to form lubricant fogged steam. The lubricator is mounted on a steam main and is balanced to prevent vibration damage during the operation of the steam equipment.

PATENTED DEC 21 1971 3,628,630
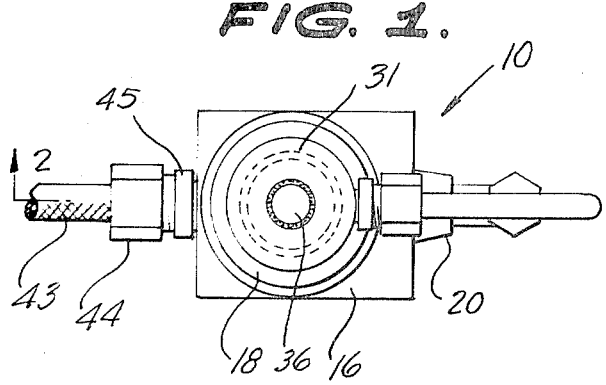
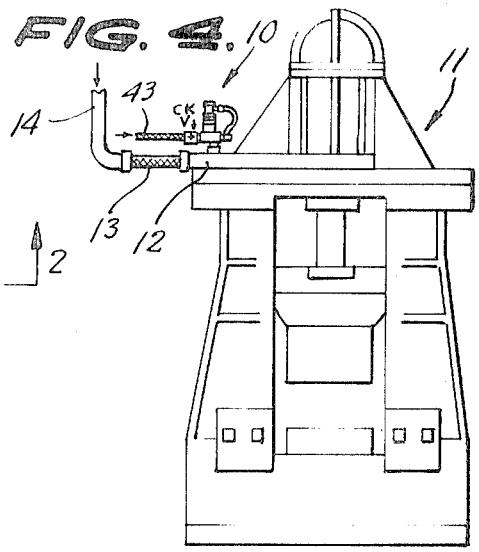
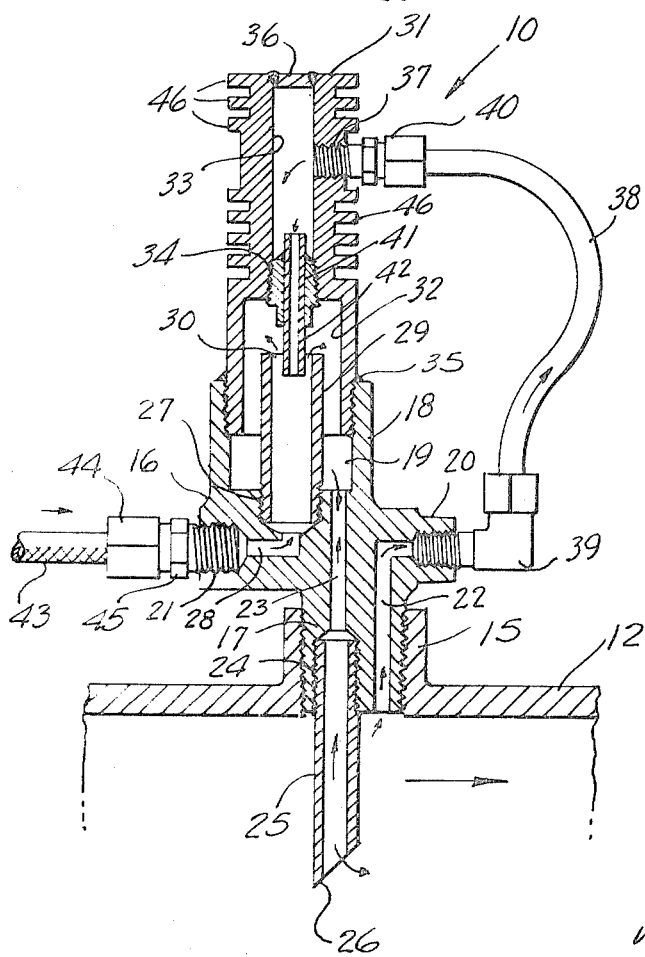
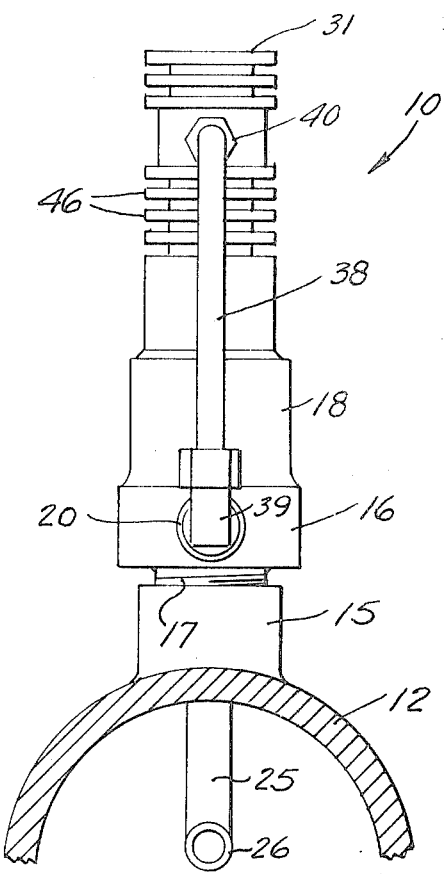
INVENTOR.
WILLIAM C. HAMMER,
BY
Berman, Davidson & Berman,
ATTORNEYS.

3,628,630

LUBRICANT DISPERSER

BACKGROUND OF THE INVENTION

1. Field of the Invention

The present invention relates to lubricators of the type which create a steam lubricant fog to lubricate and power steam operated equipment.

2. Description of the Prior Art

Prior art lubricators such as those disclosed in assignees prior patents to C. K. Sharp, U.S. Pat. No. 2,074,943 issued Mar. 23, 1937 and U.S. Pat. No. 2,657,764 issued Nov. 3, 1953 and U.S. Pat. to Piros, No. 2,776,729 issued Jan. 8, 1957 each are constructed with a cantilever design and are mounted on a vertically extending steam main. The lubricators of the prior art are subjected to tremendous vibration stresses which cause rupture of the nipple connecting the lubricator body to the steam main at the juncture of the nipple and the body. Efforts to solve the rupture problem in the prior art has included braces extending from the top of the lubricator to the steam main and this structure has proved unsuccessful in preventing the rupture. The rupture of the nipple or any other part of the lubricator releases steam from the steam main directly into the room occupied by the operators of the steam equipment creating serious injuries and burns in this personnel.

SUMMARY OF THE INVENTION

The present invention is directed to a lubricator which is constructed for attachment to a steam main with the body of the lubricator being centrally positioned and balanced with relation to the connection of the body to the steam main.

The primary object of the invention is to provide a lubricator of the type described above which will withstand tremendous vibration stresses over long periods of time without rupture and which will provide a steam fog for the lubrication of the steam-driven equipment.

Other objects and advantages will become apparent in the following specification when considered in the light of the attached drawings.

BRIEF DESCRIPTION OF THE DRAWINGS

FIG. 1 is a top plan view of the invention;

FIG. 2 is a vertical sectional view taken along the line 2—2 of FIG. 1 looking in the direction of the arrows, with parts broken away for convenience of illustration;

FIG. 3 is an end elevation of the invention shown partially broken away and in section for convenience of illustration; and FIG. 4 is an elevational view of a drop forge hammer showing the invention attached thereto.

DESCRIPTION OF THE PREFERRED EMBODIMENT

Referring now to the drawings in detail wherein like reference characters indicate like parts throughout the several figures the reference numeral 10 indicates generally a lubricator for use with a steam operated machine such as the drop forge hammer generally indicated at 11.

The drop forge hammer 11 includes a steam main 12 which extends horizontally thereacross and is connected by a flexible conduit 13 to the steam pipe 14 extending from a source of steam under pressure (not shown). The drop forge hammer 11 is subjected to tremendous vibration torque due to the work forces present therein when in operation. The steam main 12 has an internally threaded boss 15 integrally secured thereto as by welding or the like and boss 15 is positioned on the top side of the main 12 projecting upwardly therefrom.

The lubricator 10 includes a solid body 16 having an externally threaded pipe plug 17 projecting downwardly from the bottom thereof. The pipe plug 17 is threaded into the boss 15 with the lubricator 10 extending thereabove. A generally cylindrical hollow housing 18 is integrally formed with the solid body 16 and projects upwardly therefrom oppositely of the pipe plug 17. The hollow housing 18 has a generally cylindrical chamber 19 formed centrally thereof. The body 16 has an internally threaded boss 20 extending longitudinally therefrom for reasons to be assigned. An internally threaded bore 21 opens into the body 16 oppositely the boss 20.

A bore 22 extends through the pipe plug 17 and communicates with the boss 20 for reasons to be assigned. A bore 23 communicates with the chamber 19 and extends downwardly in the body 16 and into the pipe plug 17. An internally threaded bore 24 opens upwardly through the bottom of the pipe plug 17 in axial alignment with the bore 23 and in communication therewith. A delivery tube 25 is threaded into the bore 24 and extends below the pipe plug 17 into the steam main 12. The free end 26 of the delivery tube 25 is beveled away from the direction of flow of the steam in the steam main 12, so that the movement of steam in the main 12 will produce suction in the tube 25.

A threaded bore 27 is formed in the body 16 and communicates with the chamber 19 centrally thereof. A bore 28 extends through the body 16 connecting the internally threaded bore 21 with the threaded bore 27.

A hollow generally cylindrical mixing cup 29 is externally threaded at its lower end for threading into the bore 27. The mixing cup 29 extends axially upwardly in the chamber 19 and has an open upper end 30 for reasons to be assigned.

A generally cylindrical steam condenser 31 is mounted in the hollow housing 18 and extends upwardly therefrom. A relatively large bore 32 opens upwardly in the lower end of the steam condenser 31 communicating with the chamber 19 and surrounding the upper end of the mixing cup 29. An axial bore 33 extends downwardly in the steam condenser 31 and is internally threaded at 34 at the juncture of the bore 33 with the bore 32.

The steam condenser 31 is secured to the housing 18 by welding or silver soldering 35. A plug 36 is welded into the upper end of the bore 33 to seal the steam condenser 31. A threaded bore 37 opens through the side of the steam condenser 31 communicating with the bore 33. A conduit 38 is connected by a fitting 39 to the boss 20 and by a fitting 40 to the bore 37 communicating the bore 22 with the steam condenser 31.

A threaded plug 41 is seated in the threads 34 of the bore 33 and has an axial overflow tube 42 mounted therein. The overflow tube 42 extends from a point above the plug 41 into the mixing cup 29 to a point spaced below the open upper end 30 thereof.

A flexible conduit 43 extends from a source of lubricant under pressure (not shown) to a double check valve 44 which is connected to a fitting 45 mounted in the threaded bore 21.

The steam condenser 31 has a plurality of heat dissipating vanes 46 integrally formed thereon as can be seen in FIGS. 2 and 3.

OPERATION

In the use and operation of the invention the flexible conduit 43 receives lubricant under pressure which is forced through the check valve 44, bore 28 and into the mixing cup 29. Steam from the steam main 12 flows upwardly through the bore 22 conduit 38 and into the condenser 31. Steam fills the bore 33 and condenses to water which collects on the plug 34 around the upper end of the overflow tube 42. The water flows over the top of the overflow tube 42 and downwardly therein until it is discharged in the mixing cup 29. The water flowing downwardly through the tube 42 mixes with the lubricant in the mixing cup 29 and heat conducted from the steam main through the body 16 heats the mixing cup 29 creating, with vacuum from the delivery tube 25, a condition of ebullition in the lubricant water mixture so that the mixture raises in the mixing cup 29 and overflows into the chamber 19 hence through the delivery tube 25 into the steam main 12. The lubricant water mixture then commingles with the steam in the steam main 12 to produce "oil steam".

The lubricator 10 is balanced on its pipe plug 17 so that as vibration occurs in the trip hammer 11 damage does not occur in the lubricator 10 due to imbalance. It should be noted that the delivery pipe 25 is ridgedly mounted in the pipe plug 17, and that the bore 22 is offset from the delivery pipe 25 and opens through the bottom of the pipe plug 17.

Having thus described the preferred embodiment of the invention it should be understood that numerous structural modifications and adaptations may be resorted to without departing from the spirit of the invention.

What is claimed is:

1. In combination a lubricator and a steam-operated machine subject to extreme vibrational stresses with said machine being supplied with steam under pressure entering the machine in a steam main, said lubricator comprising a one-piece solid body positioned adjacent said main, an externally threaded pipe plug integrally extending from said body and threadedly connected to said main, a hollow housing integrally formed on said body and projecting upwardly therefrom, a steam condenser secured to said housing and extending upwardly therefrom, a mixing cup secured to said body and extending upwardly centrally of said housing, means for feeding lubricant into said mixing cup, means for feeding water from said steam condenser into said mixing cup, a delivery tube connected to said pipe plug and projecting into said main with said delivery tube communicating with said housing, a bore extending through said plug communicating with said steam main and conduit means for feeding steam from said bore to said steam condenser, suction through said delivery tube creating ebullition of said water and lubricant to overflow said mixing cup and flow into said steam main through said delivery tube.

2. A device as claimed in claim 1 wherein said housing and the lower end of said steam condenser form a chamber surrounding said mixing cup.

3. A device as claimed in claim 1 wherein the means connecting said condenser to said mixing cup includes an overflow tube extending from a position spaced above the body of said condenser to a position in said mixing cup spaced below the top of said mixing cup.

4. A device as claimed in claim 1 wherein said delivery tube is rigidly mounted in said pipe plug and supported by said pipe plug.

5. A lubricator for attachment to a steam main forming part of a steam operated machine comprising a one-piece body, an externally threaded pipe plug integrally formed on said body and projecting outwardly therefrom for threaded connection to the steam main, a housing integrally formed on said body and projecting upwardly therefrom, a steam condenser secured to said housing with the lower end of said condenser and the upper end of said housing forming a chamber, a hollow open top mixing cup secured to said body and extending upwardly in said chamber, means in the lower end of said steam condenser extending into said mixing cup for feeding water from said condenser to said mixing cup, means for feeding lubricant under pressure into said mixing cup for mixing with said water, means extending from said main through said pipe plug to said condenser for feeding steam from said main to said condenser, a delivery tube rigidly connected to said pipe plug and extending into said main, communicating through said pipe plug with said chamber for creating ebullition in said mixing cup and feeding the oil-water mixture into said steam main through said tube.

6. A device as claimed in claim 5 wherein the means for feeding water from said condenser to said mixing cup comprises an overflow tube mounted in the lower end of said steam condenser with its upper end positioned above the lower end of said steam condenser and its lower end positioned below the upper end of said mixing cup.

7. A device as claimed in claim 5 wherein the means for feeding steam from said pipe plug to said condenser comprises a port in said pipe plug and a conduit extending from said port to said condenser.

* * * * *